April 23, 1963 D. C. HAMMAN 3,086,421
SHEET METAL NUT HAVING REGULAR POLYGONAL OPENING
WITH HELICALLY DEFLECTED EDGES
Filed Aug. 29, 1958 2 Sheets-Sheet 1
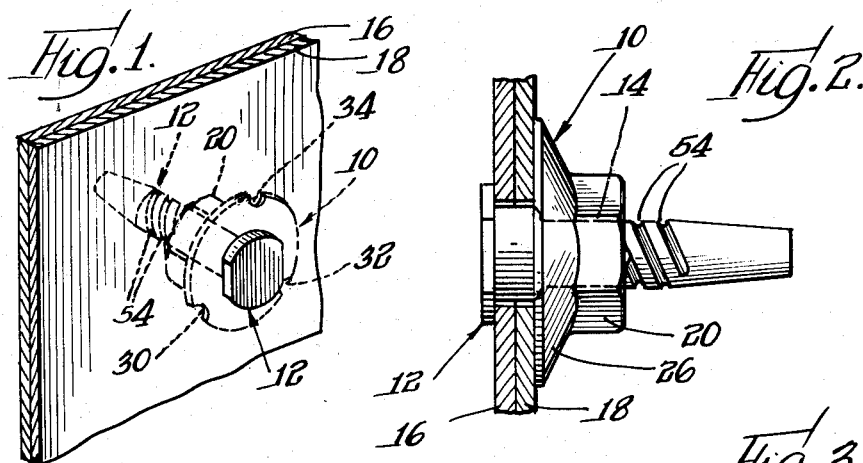
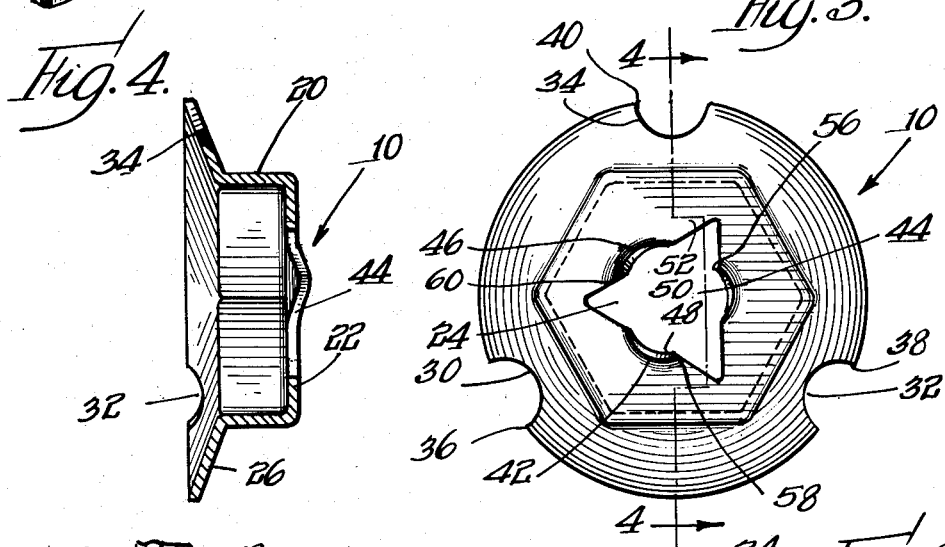
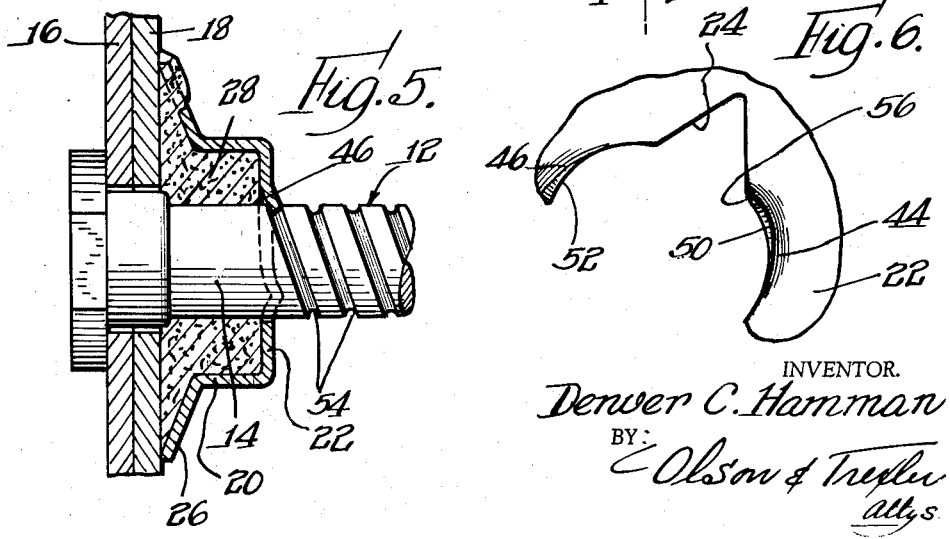
INVENTOR.
Denver C. Hamman
BY
Olson & Trexler
attys.

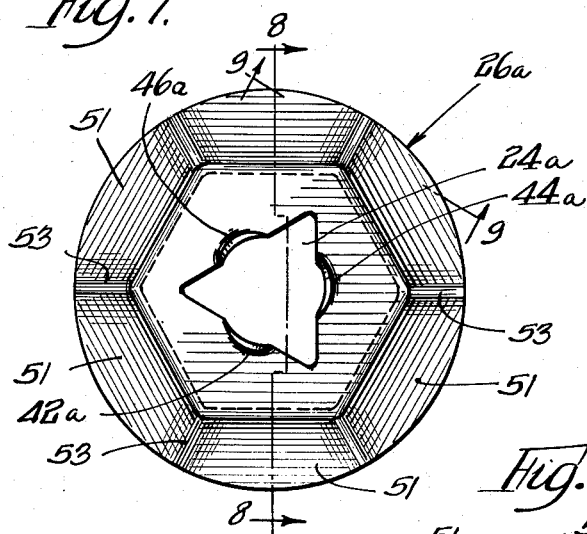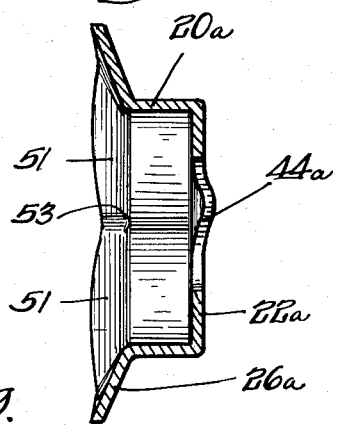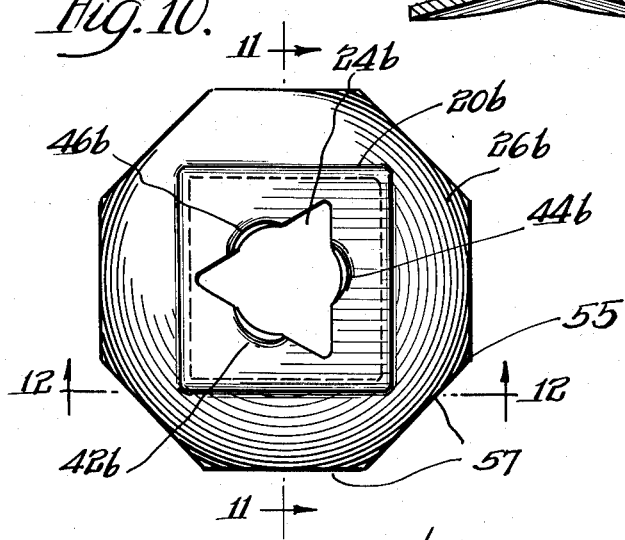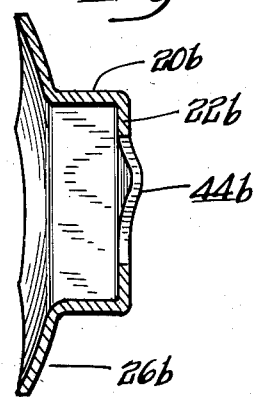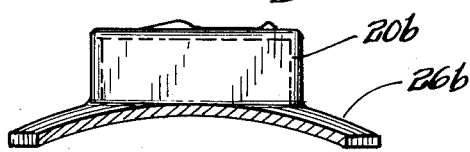
INVENTOR.
Denver C. Hamman United States Patent Office 3,086,421
Patented Apr. 23, 1963

3,086,421
SHEET METAL NUT HAVING REGULAR POLYGONAL OPENING WITH HELICALLY DEFLECTED EDGES
Denver C. Hamman, Palatine, Ill., assignor to Illinois Tool Works, Inc., a corporation of Delaware
Filed Aug. 29, 1958, Ser. No. 758,016
5 Claims. (Cl. 85—32)

The present invention relates to a novel fastening device, and more particularly to a novel sheet material nut member.

The present invention contemplates a sheet material nut member which is adapted to be applied to an unthreaded stud. It has been proposed to provide sheet material nut members with means adapted to form or cut complementary threads in an unthreaded stud member during initial assembly of the parts. However such heretofore proposed nut members have not always been entirely satisfactory for various reasons. For example, certain of the prior proposals have been unduly difficult and expensive to manufacture or subject to breakage as a result of constructions which cause concentration of stresses during application of the nut members to unthreaded studs. In addition certain constructions which have been proposed do not have sufficient holding power for many installations or are not capable of easy and fast application to a stud in a manner which insures proper formation of the desired threads on the studs.

It is an important object of the present invention to provide a novel sheet material nut member adapted to be applied to an unthreaded stud, which nut member may be relatively easily and economically produced and is constructed so as to have improved strength and holding power.

A more specific object of the present invention is to provide a novel sheet material nut member adapted to form or cut complementary thread means in an unthreaded stud member, which nut member is constructed so as to minimize stress concentrations therein during application to a stud member so as to reduce any possibility of breakage of the nut member.

A further object of the present invention is to provide a novel sheet material fastener of the above described type which is constructed so that it may be relatively rapidly advanced onto a stud while still providing improved holding power.

Another more specific object of the present invention is to provide a novel sheet material nut member of the above described type which is constructed so that upon seating of the nut member against a workpiece, the driving torque arises abruptly to a value higher than the stripping torque so as to resist the milling of an annular groove in the workpiece.

Still another object of the present invention is to provide a novel sheet material workpiece of the above described type which is constructed so that in the event the nut member is over driven to a point where the thread formed on the stud member is stripped, the nut member will cut or form new threads upon removal thereof.

Other objects and advantages of the present invention will become apparent from the following description and the accompanying drawings wherein:

FIG. 1 is a fragmentary perspective view showing a nut member incorporating features of the present invention assembled with a complementary stud member and a work structure;

FIG. 2 is an enlarged fragmentary partial sectional view taken along line 2—2 of the assembly shown in FIG. 1;

FIG. 3 is a further enlarged plan view of a nut member incorporating features of the present invention;

FIG. 4 is a sectional view taken along line 4—4 in FIG. 3;

FIG. 5 is an enlarged fragmentary sectional view showing an assembly including the nut member of the present invention in greater detail;

FIG. 6 is an enlarged fragmentary plan view of a nut member of the present invention showing a feature of the structure in greater detail;

FIG. 7 is a plan view showing a nut member embodying a modified form of the present invention;

FIG. 8 is a cross sectional view taken along the line 8—8 in FIG. 7;

FIG. 9 is an enlarged sectional view taken along line 9—9 in FIG. 7;

FIG. 10 is a plan view showing another embodiment of the present invention;

FIG. 11 is a cross sectional view taken along line 11—11 in FIG. 10, and

FIG. 12 is a sectional view taken along line 12—12 in FIG. 10.

Referring now more specifically to the drawings wherein like parts are designated by the same numerals throughout the various figures, a fastener or nut member 10 is shown, which nut member is formed from suitable sheet material such as sheet steel. As will be discussed more in detail below, the nut member 10 is particularly adapted to be applied to a stud member 12 having a shank 14 which is initially smooth or unthreaded. It will be appreciated that the nut and stud members may be used in various assemblies for connecting workpieces 16 and 18.

The one piece sheet material nut member 10 comprises a hollow central body 20 provided by an axially extending wall having a non-circular or hexagonal peripheral configuration so as to facilitate turning of the nut member by suitable tool means, not shown. An end wall 22 is formed integrally with and extends radially inwardly from an outer end margin of the body 20, which end wall is provided with stud accommodating central aperture means 24 which will be described more in detail below. A peripheral annular flange 26 extends axially and radially outwardly from an integral junction with an inner end of the body 20 so as to substantially increase the effective clamping area of the nut member. In addition, the flange 26 may be resiliently deflected when the nut member is tightened against a workpiece so as to provide a spring action which causes the nut member to bind on the stud so as to resist unauthorized retrograde movement. It is to be noted that the flange 26 is preferably inclined at an angle of about 25° with respect to a plane containing the peripheral edge of the flange since this structure enables the flange to function in the desired manner and provides the flange with improved resistance to undue or complete flattening or axial collapsing.

For certain installations it is desirable to provide an annular body 28 of priable sealing material within the nut as shown in FIG. 5 so as to prevent the passage of air, moisture, dust or other foreign material through the apertures in the workpieces. The flange 26 is formed so as to present a relatively sharp peripheral edge for engagement with the workpiece 18 for preventing the escape of any of the sealing material around a major portion of the flange periphery. However, the flange is provided with a plurality of relatively small peripheral recesses 30, 32 and 34 into which portions of the sealing material are extruded as shown in FIG. 5. This provides a mechanical interlock between the sealing material and the nut body which aids in preventing the sealing compound from shearing loose from the nut member during a tightening operation. These notches or recesses also serve to present corners 36, 38 and 40 which are adapted aggressively to engage the workpiece 18 during a driving or tightening operation when the nut member has been tightened the desired amount. This engagement of the corners with the workpiece causes the driving torque to rise abruptly higher than the torque necessary to strip the threads on the stud. This prevents the nut member from being rotated after the desired tightening has been accomplished so as to cause milling of an annular groove in the workpiece.

It is to be noted that in accordance with the present invention, the aperture means 24 in the end wall 22 is in the form of a polygonal figure. As shown in FIG. 3, this figure is preferably a substantially equilateral triangle although for certain applications a square figure would be suitable. The corners of the triangular opening are rounded in the manner shown so as to minimize any possibility of a crack occurring at such corners. It is further to be noted that an intermediate portion of each side edge of the polygonal central opening means 24 is helically deflected along the circumference of a circle so as to provide thread segments 42, 44 and 46. The diameter of the circle of the arcuately and helically disposed thread segments is greater than the diameter of a circle which is tangent to all of the edges of the central opening 24 and less than the diameter of another circle which includes all of the corners of the opening means 24. It has been found that the above mentioned construction which is obtained by deflecting the segments 42, 44 and 46 from initially straight margins of the central opening has substantially improved strength and resistance to cracking or breaking under the stresses on the nut member during application to an unthreaded stud. It will be appreciated that the arcuately and helically deflected thread segments 42, 44 and 46 are also inclined so as to present relatively sharp helically disposed corners 48, 50 and 52 respectively which are adapted aggressively to engage the stud shank 14 and form a plurality of separate complementary thread segments 54 therein.

As shown best in FIG. 6, the junction 56 between the trailing end of the thread segment 44 and the straight edge of the central opening is rounded. The thread segments 42 and 46 are provided with similar rounded corners 58 and 60 at the junctions of their trailing ends with the straight edges of the polygonal opening. With this structure, the thread segments are adapted to form complementary threads in the stud shank during reverse rotation of the nut member. This feature facilitates removal of the nut in situations where the nut is inadvertently overdriven to a point where the first threads formed in the stud are stripped and the nut has milled an annular groove around the stud.

FIGS. 7–9 show a slightly modified form of the present invention which is similar to the structure described above as indicated by the application of identical reference numerals with the suffix "a" added to corresponding elements. This embodiment differs only in that the peripheral flange 26a is formed so that it includes a plurality of flat sections 51 integrally joined to each other by corner or rib portions 53. The corner or rib portions 53 which are relatively sharply bent as shown best in FIG. 9 provide the flange 26a with substantial improved resistance to undue collapsing when the nut member is clamped against the workpiece, and the substantially flat inclined side sections or portions 51 provide a strut action which further increases the resistance of the flange to axial collapsing.

In FIGS. 10–12 there is shown another modified form of the present invention which is similar to the structures described above as indicated by the application of identical reference numerals with the suffix "b" added to corresponding elements. This embodiment illustrates the manner in which the body portion 20b may be formed in various different shapes. More specifically the embodiment shows the body portion 20b as having a rectangular or square shape rather than a hexagonal shape. This embodiment also differs from the above described structures in that the peripheral margin of the flange 26b is polygonal in configuration rather than circular so that workpiece engageable corners 55 are presented between straight edges 57 thereof. In the specific embodiment shown, the flanges 26b is provided with an octagonal peripheral configuration. With this structure, successive straight edge sections of the flange periphery will not track each other during tightening of the nut member against a workpiece so as to minimize any possibility of injury to the workpiece and so as to improve the engagement of the corner portions with the workpiece in a manner which restrains unauthorized retrograde movement of the nut.

While the preferred embodiments of the present invention have been shown and described herein, it is obvious that many structural details may be changed without departing from the spirit and scope of the appended claims.

The invention is claimed as follows:

1. A one piece sheet material rotary nut member suitable for application to an unthreaded stud comprising an axially thin substantially planar section disposed transversely of an axis of rotation of the nut member, said section having a generally centrally disposed equilateral triangular aperture means therethrough defined by initially substantially straight uninterrupted side edges extending entirely between corners of the triangular aperture means, intermediate portions of said edges located substantially centrally between and spaced from corners of said triangular aperture means and entirely within a circle disposed within said corners being helically deflected to provide a helical edge portion with a leading end substantially in the plane of said section and a trailing end out of the plane of said section, each helical edge portion being a portion of an individual helix disposed for threadedly engaging the stud whereby three individual threads are formed on said stud, and said nut member having inclined edge portions providing junctions between trailing ends of said helical edge portions and said substantially straight edges, which junctions are rounded with an arch of substantial radius reversely directed with respect to said helical edge portions for facilitating threaded engagement of the helical portions with said stud upon reverse rotation of the nut member, each said helical edge portion and inclined edge portion being radially outwardly with respect to said axis of a plane perpendicular to said section which contains the straight edge portions on either side thereof, the material of said planar section extending uninterruptedly from the straight side edge at one side of said helical edge portion to the straight side edge on the opposite side of said helical edge portion to provide back-up strength for said helical edge portion and said inclined edge portion.

2. A one piece sheet material rotary nut member comprising a hollow axially extending body portion having a noncircular transverse cross section, a substantially planar transverse end wall integral with outer end of said body portion, said wall having a generally centrally located substantially equilateral polygonal aperture means therethrough defined by at least three initially substantially straight edges extending substantially directly and without interruption between corners of the aperture means, intermediate portions of said edges located substantially centrally between corners of the aperture means being helically deflected to provide a helical edge portion with a leading end substantially in the plane of said end wall and a trailing end out of the plane of said end wall, each helical edge portion being a portion of an individual helix disposed for threadedly engaging a stud member and the like whereby three individual threads are formed on said stud, said nut member having inclined edge portions providing junctions between trailing ends of said helical edge portions and said substantially straight edges, which junctions are rounded with an arch of substantial radius reversely directed with respect to said helical edge portions for facilitating threaded engagement of the helical portions with said stud upon reverse rotation of the nut member, each said helical edge portion and inclined edge portion being radially outwardly with respect to said axis of a plane perpendicular to said end wall which contains the straight edge portions on either side thereof, the material of said planar end wall extending uninterruptedly from the straight side edge at one side of said helical edge portion to the straight side edge on the opposite side of said helical edge portion to provide back-up strength for said helical edge portion and said inclined edge portion and a generally dome shaped annular flange integral with an end of said body portion opposite from said end wall, said flange extending radially outwardly and being inclined axially away from said end wall at an angle of about 25° with respect to a plane containing a peripheral margin of the flange.

3. A one piece sheet material nut member, as defined in claim 2, wherein said flange includes circumferentially spaced relatively small peripheral recess means presenting corners engageable with a workpiece for resisting rotation of the nut member relative to the workpiece when the nut member is tightening against the workpiece.

4. A one piece sheet material nut member, as defined in claim 2, wherein said annular flange comprises circumferentially arranged substantially planar sections, and generally radially extending rib portions disposed between and integrally joining said planar sections.

5. A one piece sheet material rotary nut member, as defined in claim 2, wherein said annular flange has a polygonal peripheral edge and includes corner portions extending for engagement with a workpiece.

References Cited in the file of this patent

UNITED STATES PATENTS

| | | |
|---|---|---|
| 779,751 | Waitt | Jan. 10, 1905 |
| 932,396 | Kenney | Aug. 24, 1909 |
| 2,259,425 | Murphy | Oct. 14, 1941 |
| 2,284,081 | Beggs | May 26, 1942 |
| 2,335,205 | Zepp | Nov. 23, 1943 |
| 2,335,367 | Thompson | Nov. 30, 1943 |
| 2,398,827 | Graham | Apr. 23, 1946 |
| 2,734,547 | Hotchkin | Feb. 14, 1956 |
| 2,761,349 | Heller | Sept. 4, 1956 |
| 2,794,476 | Hanneman | June 4, 1957 |
| 2,895,362 | Jamgotchian | July 21, 1959 |
| 2,928,445 | Van Buren | Mar. 15, 1960 |
| 2,930,424 | Van Buren | Mar. 29, 1960 |
| 2,969,705 | Becker | Jan. 31, 1961 |
| 2,986,059 | Duffy | May 30, 1961 |

OTHER REFERENCES

Automotive Industries, volume 115, page 141, Oct. 15, 1956.